United States Patent

[11] 3,624,092

[72] Inventor George Levitt
  Wilmington, Del.
[21] Appl. No. 22,027
[22] Filed Mar. 23, 1970
[45] Patented Nov. 30, 1971
[73] Assignee E. I. du Pont de Nemours and Company
  Wilmington, Del.
  Original application June 12, 1967, Ser.
  No. 646,154, now Patent No. 3,509,170.
  Divided and this application Mar. 23, 1970,
  Ser. No. 22,027

[54] CNS DEPRESSANT AMINO-OXAZOLINE
  COMPOUNDS, METHODS, AND COMPOSITIONS
  2 Claims, No Drawings
[52] U.S. Cl. .................................................... 260/288 R
[51] Int. Cl. ..................................................... C07d 85/36
[50] Field of Search........................................... 260/288

[56] References Cited
  UNITED STATES PATENTS
  3,511,851  5/1970  Levitt ........................... 260/288 X
Primary Examiner—Donald G. Daus
Attorney—Don M. Kerr ABSTRACT: Amino-oxazolines useful as central nervous system depressants having the formula:

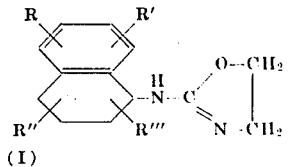

(I)

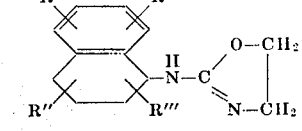

(II)

wherein
X is oxygen, sulfur or methylamino;
R is hydrogen or alkyl;
R' is hydrogen, alkyl, alkoxy, alkylthio, dimethylamino, fluorine, chlorine or bromine;
R" is hydrogen or alkyl;
R''' is hydrogen or alkyl.
Typical is 2-(4-thiochromanylamino)-2-oxazoline useful as a central nervous system depressant.

CNS DEPRESSANT AMINO-OXAZOLINE COMPOUNDS, METHODS, AND COMPOSITIONS

CROSS-REFERENCE TO RELATED APPLICATION

This application is a divisional of my application Ser. No. 646,154, filed June 12, 1967, now U.S. Pat. No. 3,509,170.

BACKGROUND OF THE INVENTION

The following applications relate to various classes of oxazolines generally useful as pharmaceuticals:

Harvey, Ser. No. 521,746, filed Jan. 19, 1966, now U.S. Pat. No. 3,453,284;
Levitt, Ser. No. 479,054, filed Aug. 10, 1965, now U.S. Pat. No. 3,499,083;
Levitt, Ser. No. 479,055, filed Aug. 10, 1965, now U.S. Pat. No. 3,499,084;
Harvey, Ser. No. 468,999, filed July 1, 1965;
Harvey, Serial No. 348,290, filed Feb. 28, 1964, now abandoned;
Harvey, Ser. No. 313,756, filed Sept. 30, 1963, granted as U.S. Pat. No. 3,432,600.

The present invention is directed to a new class of oxazolines having central nervous system depressant effect.

SUMMARY OF THE INVENTION

This invention relates to amino-oxazolines.

More specifically this invention refers to compounds of the formula:

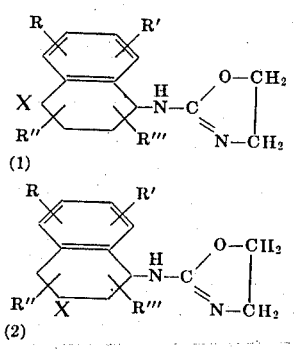

wherein
X is oxygen, sulfur or methylamino;
R is hydrogen or alkyl of one through four carbon atoms;
R' is hydrogen, alkyl of one through four carbon atoms, alkoxy of one through four carbon atoms, alkylthio of one through four carbon atoms, dimethylamino, fluorine, chlorine, or bromine;
R'' is hydrogen or alkyl of one through four carbon atoms;
R''' is hydrogen or alkyl of one through four carbon atoms;

Preferred because of excellent central nervous system depressant activity at low use rates are those compounds of formulas (1) and (2) wherein X is oxygen or sulfur; R, R'' and R''' are hydrogen and R' is alkyl, alkoxy or hydrogen. The manner and process of making and using this invention is described in U.S. Pat. No. 3,509,170, U.S. Class No. 260, Subclass No. 307 issued Apr. 28, 1970, the disclosure of which is hereby incorporated by reference.

I claim:

1. A compound of the formula:

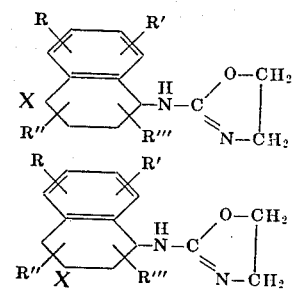

wherein
X is NCH$_3$
R is selected from the group consisting of hydrogen and methyl;
R' is selected from the group consisting of hydrogen, alkyl of one through four carbon atoms; and alkoxy of one through four carbon atoms;
R'' is selected from the group consisting of hydrogen and methyl;
R''' is selected from the group consisting of hydrogen and methyl.

2. A compound according to claim 1 which is 2-(1,2,3,4-tetrahydro-1-methyl-4-quinolinylamino)-2-oxazoline.

* * * * *

PO-1050
(5/69)

UNITED STATES PATENT OFFICE
CERTIFICATE OF CORRECTION

Patent No. _____3,624,092_____   Dated_____November 30, 1971

Inventor(s) _____George Levitt_____

It is certified that error appears in the above-identified patent and that said Letters Patent are hereby corrected as shown below:

In Column 2 at line 7, delete "R" and insert in place thereof -- R''' -- ;

at line 11, delete "R" and insert in place thereof -- R''' -- ;

at line 43, delete "R" and insert in place thereof -- R''' -- .

Signed and sealed this 9th day of May 1972.

(SEAL)
Attest:

EDWARD M. FLETCHER, JR.
Attesting Officer

ROBERT GOTTSCHALK
Commissioner of Patents